United States Patent Office

3,044,969
Patented July 17, 1962

3,044,969
ION EXCHANGERS CONTAINING THIOPHENOL GROUPS
Hans Seifert, Bergisch-Neukirchen, Germany, assignor to Farbenfabriken Bayer Aktiengesellschaft, Leverkusen, Germany, a corporation of Germany
No Drawing. Filed Mar. 24, 1959, Ser. No. 801,452
Claims priority, application Germany Apr. 3, 1958
4 Claims. (Cl. 260—2.2)

The present invention relates to ion exchangers containing thiophenol groups.

The production of ion exchangers containing thiophenol groups from polystyrene which is not cross-linked is known from the literature. According to one process, disclosed in the Journal of the American Chemical Society, volume 77 (1955), page 3675, polystyrene which has not been cross-linked is nitrated and the nitro compound obtained is reduced with hydrogen and palladium as catalyst to form the amine. The diazo compound of the amine is reacted according to Leuckardt with potassium ethyl xanthate. After the alkali hydrolysis of the xanthogen ester, there is finally obtained a resin containing —SH-groups. Cross-linking probably takes place by partial decomposition of the diazo polymer. Other synthesis start from the p-aminoacetophenone and lead by way of a number of intermediate stages to the poly-p-thiostyrene (Journal of the American Chemical Society, volume 77 (1955), page 3675), which is soluble in alkalies and in organic solvents and which is obtained in the form of a powder.

For many practical purposes, however, it is desired that such exchangers should be insoluble and have a pearl structure, or at least a granular structure.

It has now been found that sulphochlorides of cross-linked organic polymers containing aromatic nuclei the carbon atoms of which constitute the major proportion of the total number of the carbon atoms of the polymer can be converted by reduction with polysulphides, more especially alkali polysulphides, into ion exchangers containing thiophenol groups. The products have the pearl structure and high mechanical strength of the starting material.

These products are technically valuable as electron exchangers. They are also suitable for selective exchange processes.

The cross-linked polymers containing aromatic nuclei as used for carrying out the present process, are known per se. Especially to be considered for this purpose are copolymers of a predominant proportion of at least one aromatic monovinyl compound, such as for example styrene, substituted styrene (such as vinyl toluene, ethylstyrene) or vinyl naphthalene, and a subordinate proportion of a polyethylenically unsaturated cross-linking agent preferably divinyl benzene, furthermore, a substituted divinyl benzene (trivinylbenzene, divinyltoluene) divinylxylene, divinylethylbenzene, divinylether, ethyleneglycol dimethacrylate, ethyleneglycol diacrylate, diallylmaleate, a polyester of a polyhydric alcohol and an olefinically unsaturated carboxylic acid, such as for example ethylene glycol and maleic acid. These copolymers can have both a gel structure and a sponge structure. The amount of cross-linking agent may vary within wide limits.

In case of copolymers having a gel structure amounts of about 0.5 to 15 percent by weight of cross-linking agent as calculated on the amount of total monomers and in the case of copolymers having a sponge structure amounts of about 0.5 to 30 percent by weight are preferably used. Such copolymers are described in, for example U.S. patent specifications 2,366,007; 2,466,075; 2,500,149; 2,591,573; 2,591,574; 2,616,877; 2,629,710; 2,631,999; 2,632,000; 2,642,417; 2,725,361; 2,794,785; 2,597,439; 2,597,440; and in U.S. application Serial No. 718,989.

The sulphochlorides of the aforementioned copolymers are obtained by contacting bead polymers of aromatic polyvinyl compounds or copolymers of aromatic polyvinyl compounds and aromatic monovinyl compounds at temperatures of about 20–100° C. with a molar excess of chlorosulphonic acid. The chlorosulphonic acid is preferably applied in amounts of about 3–6 mols per benzene nucleus present in the copolymer. If desired, the reaction may be carried through in the presence of an inert organic solvent preferably aliphatic or cycloaliphatic halogenated hydrocarbons such as ethylenechloride. The reaction takes about 10–20 hours. Thereafter the reaction mixture is worked up by removing the surplus of chlorosulphonic acid by means of suitable inert solvents as for instance glacial acetic acid and/or ether. It is, furthermore, possible to treat the reaction mixture at first with an about 80 percent sulphuric acid in order to remove the surplus of chlorosulphonic acid. Thereafter the chlorosulphonated copolymer is separated from the sulphonic acid and washed first with glacial acetic acid and then with ether or other inert solvents. The chlorosulphonated copolymers thus produced contain per 2 benzene nuclei about 1–3 —SO$_2$Cl-groups.

Suitable polysulphides for reducing the aforementioned sulphochlorides are alkaline metal and earthen alkaline metal polysulphides containing 2–7 sulphur atoms. Polysulphides are preferably applied in a molar excess as calculated on the —SO$_2$Cl-groups present in the copolymer. Suitable quantities are for instance 2–10 mols of polysulphide per one —SO$_2$Cl-group.

Suitable polysulphides are for instance Na$_2$S$_2$, Na$_2$S$_3$, Na$_2$S$_4$, CaS$_2$, CaS$_4$, (NH$_4$)$_2$S$_2$.

The reaction of the aforementioned sulphochlorinated copolymers with sulphochlorides is carried through in an aqueous medium having a pH-value of about 9–13 at temperatures ranging between 50 and 250° C. The reaction mixture is worked up by separating the reaction products from the reaction mixture and then washing the reaction products with water.

Example 1

50 g. of styrene pearl polymer cross-linked with 4 percent divinylbenzene having a cornsize of 0.3 to 0.5 mm. are chlorosulphonated with 150 cc. of chlorosulphonic acid over a period of 16 hours at 60° C., the mixture is initially stirred. The excess acid is removed with glacial acetic acid and thereafter the sulphochloride is washed with ether. 450 g. of Na$_2$S.9H$_2$O, 60 g. of sulphur and 280 g. of water are dissolved by heating in a flask equipped with a stirrer, thermometer and reflux condenser and the polystyrene sulphochloride is added. After a treatment period of 16 hours at 50° C., 350 cc. of an exchanger in pearl form and with a sulphur content of 21.2 are obtained.

The maximum effective volume capacity (NVK) with respect to N/100 CuSO$_4$ solution is 4.00. The ion exchanger contains besides —SH-groups also —SO$_3$H-groups. Therefore, in the acid form it is capable to absorb sodium ions from a common salt solution (common salt cleavage). The NVK from the common salt cleavage is 1.00.

Example 2

The sulphochloride prepared from 50 g. of pearl polymer in accordance with the data given in Example 1 is treated in an autoclave for 10 hours at 150° C. while stirring with a solution of 600 g. of Na$_2$S.9H$_2$O, 80 g. of sulphur and 380 cc. of water. 165 cc. of an exchanger in pearl from containing 25.1 percent of sulphur are obtained (theoretical for one SH-group per benzene nucleus:

23.7 percent of sulphur). The NVK with respect to N/100 CuSO$_4$ solution is 4. From the common salt cleavage, an NVK of 1.1 is calculated.

*Example 3*

The sulphochloride prepared from 50 g. of pearl polymer (cf. Example 1) is reduced in an autoclave with 450 g. of Na$_2$S.9H$_2$O, 60 g. of sulphur and 380 cc. of water for 2 hours at 200° C. and a pressure of 12 atm. gauge. An exchanger in pearl form with 27 percent of sulphur is obtained. The NVK with respect to N/100 CuSO$_4$ solution is 2.80 and the NVK from the common salt cleavage is 0.50.

What is claimed is.

1. A process of producing a water-insoluble ion-exchange resin by reduction of the sulfochloride groups of a benzene-insoluble cross-linked organic polymer containing aromatic nuclei, cross-linking being effected by means of a polyethylenically unsaturated organic compound, the carbon atoms of said aromatic nuclei constituting the major proportion of the total number of the carbon atoms of the polymer which comprises treating the said polymer in an aqueous medium at temperatures between 50 to 250° C. with an inorganic polysulfide to reduce the sulfochloride groups of said copolymers to sulfhydryl groups, said polysulfides being applied in a molar excess as calculated on the sulfochloride groups present in the copolymer, and thereafter recovering the reaction product from the reaction medium.

2. Process of claim 1 wherein said polysulfide is an alkali metal polysulfide containing 2–7 sulfur atoms.

3. Process of claim 1 wherein said cross-linked organic polymer contains 1–3 sulfochloride groups per 2 benzene nuclei.

4. A process for producing a water-insoluble ion-exchange resin which comprises treating with an inorganic polysulfide the sulfochloride groups of a benzene-insoluble organic polymer which is cross-linked by a minor proportion of a polyethylenically unsaturated organic compound, said organic polymer having per each two aromatic nuclei at least one —SO$_2$Cl-group and said organic polymer furthermore containing aromatic nuclei, the carbon atoms of which constitute the major proportion of the total number of the carbon atoms of the polymer, said treatment being conducted in an aqueous medium at temperatures between 50–250° C. with said inorganic polysulfide having at least two sulfur atoms to reduce the sulfochloride groups of said copolymers to sulfhydryl groups, said polysulfides being applied in a molar excess as calculated on the sulfochloride groups present in the copolymers, and thereafter recovering the reaction product from the reaction medium.

References Cited in the file of this patent

UNITED STATES PATENTS 2,891,916    Hwa _____ June 23, 1959

OTHER REFERENCES

Groggins: "Unit Processes in Organic Synthesis," 4th edition, page 99, McGraw-Hill (1952). Copy in Sci. Lib.